2 Sheets—Sheet 1.

W. P. KIDDER.

SAFETY DEVICE FOR ELEVATORS.

No. 11,402. Reissued Jan. 30, 1894.

Witnesses
John McDonnie
Thos. E. Robertson

Inventor
Wellington P. Kidder
By T. J. W. Robertson
Attorney

THE NORRIS PETERS CO., PHOTO-LITHO., WASHINGTON, D. C.

W. P. KIDDER.

SAFETY DEVICE FOR ELEVATORS.

No. 11,402. Reissued Jan. 30, 1894.

Witnesses
Thos. E. Robertson
W. E. Clendaniel.

Inventor
Wellington P. Kidder
By T. J. W. Robertson
Attorney

THE NORRIS PETERS CO., PHOTO-LITHO., WASHINGTON, D. C.

UNITED STATES PATENT OFFICE.

WELLINGTON P. KIDDER, OF BOSTON, MASSACHUSETTS.

SAFETY DEVICE FOR ELEVATORS.

SPECIFICATION forming part of Reissued Letters Patent No. 11,402, dated January 30, 1894.

Original No. 495,094, dated April 11, 1893. Application for reissue filed September 25, 1893. Serial No. 486,485.

*To all whom it may concern:*

Be it known that I, WELLINGTON P. KIDDER, a citizen of the United States of America, residing at Boston, in the county of Suffolk and State of Massachusetts, have invented certain new and useful Improvements in Safety Devices for Elevators, of which the following is a specification, reference being had therein to the accompanying drawings.

This improvement is designed to provide a means for preventing the opening of doors of elevator cars and wells, except when the car is stationary and in line with a well-door; whereby the many dangerous accidents now caused by starting the car before the door is closed will be prevented.

Previous to my invention, it had been proposed to combine with swinging doors, stops on the controlling rope which would prevent the well-door opening when the car was in motion and would lock the rope fast by the opening of the door, but so far as I can ascertain, no one has ever combined these stops with a sliding door. Swinging doors are inconvenient in elevators and are seldom used with them, and the combination above referred to has, therefore, never, so far as I am aware, come into practical use.

It has also been proposed to combine with a sliding door a kind of bell crank lever and a bolt in such a manner as to accomplish the same purpose, the said bolt being passed through a hole in a wheel around which the operating or controlling rope is wound. This, however, besides requiring attachments to the door to operate the lever, required at each doorway the lever, bolt and wheel above referred to, and moreover the rope had to be much longer so as to pass around the wheel at each door, the whole adding so much to the expense of construction that I believe the same has never come into practical use. My invention is designed to accomplish the same result without the many additional parts and the added length of rope referred to, requiring in its simplest form only blocks or stops fixed on the rope, which rope is only of the ordinary length.

To this end my invention consists in the apparatus hereinafter described and shown and then definitely claimed at the end hereof.

Figure 1:
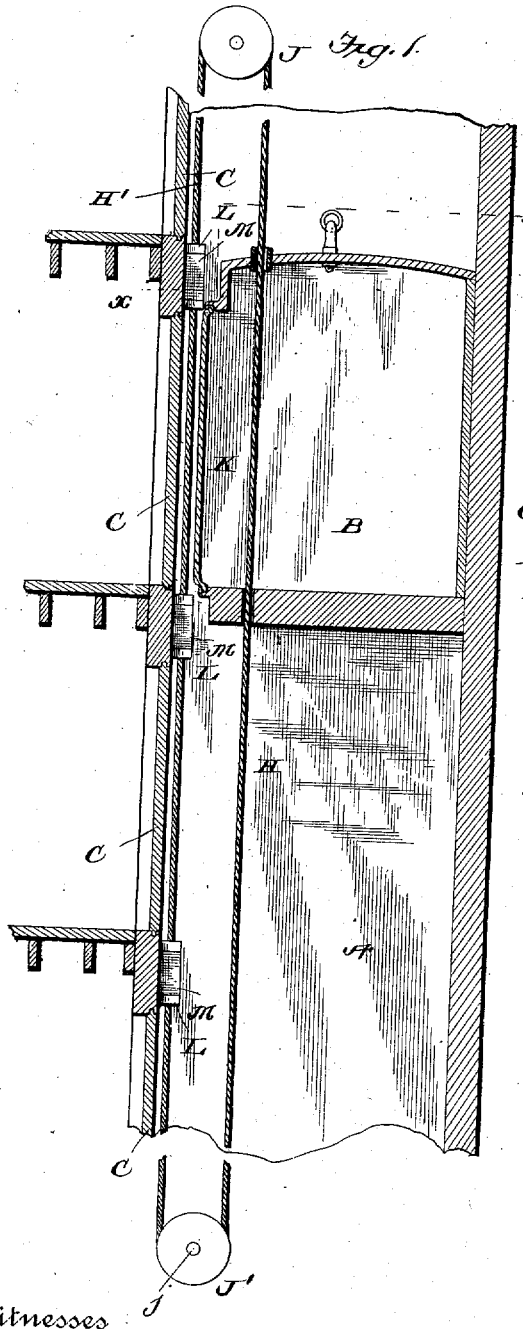
Figure 2:
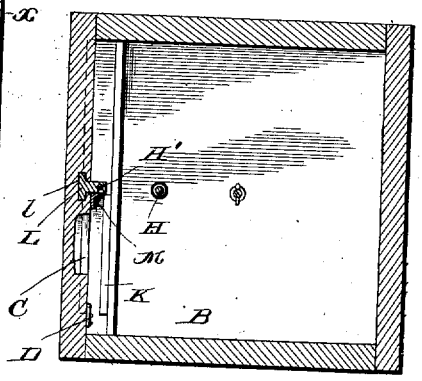
Figure 2A:
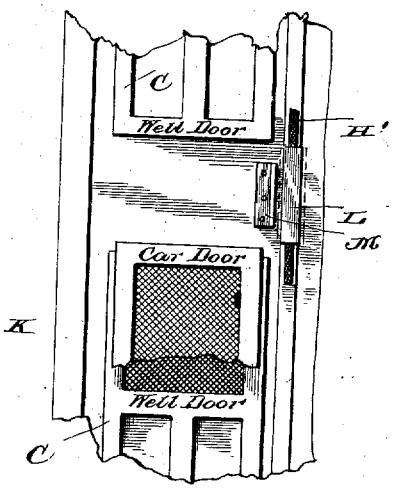
Figure 3:
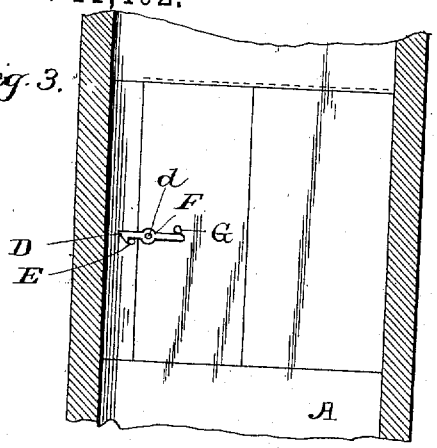
Figure 5:
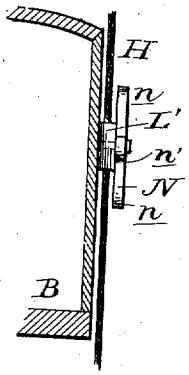
Figure 4:
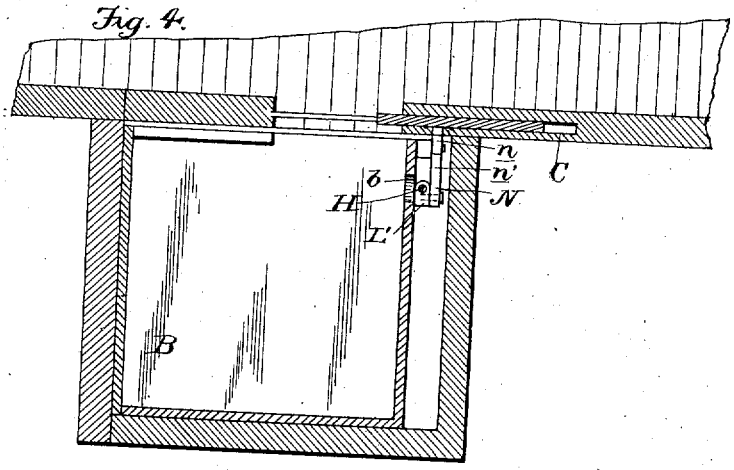
Figure 7:
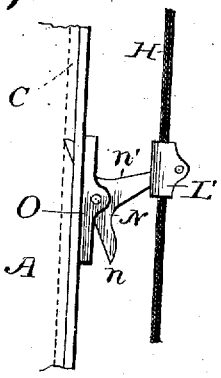
Figure 6:
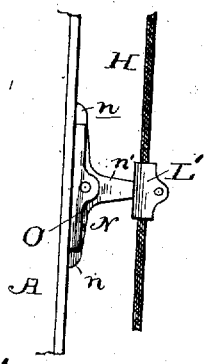

In the accompanying drawings—Figure 1 is a vertical section of an elevator, constructed according to my invention. Fig. 2 is a horizontal section of the same, on the line $x\ x$ of Fig. 1. Fig. $2^a$ is a detail showing some of the parts in Fig. 2 in elevation on a larger scale. Fig. 3 is a vertical section of part of an elevator taken at right angles to that shown in Fig. 1. Fig. 4 is a horizontal section of a modification. Fig. 5 is a front view of the door, rope, &c., of the same. Fig. 6 is a side view of the same parts as in Fig. 5. Fig. 7 is a similar view with the parts in a different position.

Referring now to the details of the drawings by letter—A represents an elevator well, in which travels the elevator car B, which may be raised and lowered by any suitable means, but as these means form no part of my present invention, it is unnecessary to describe them.

C C represent the doors of the well, each of which may be provided with a hooked latch D, pivoted at $d$ and catching over a pin E on the frame surrounding the door-way. It may be provided with a knob F to turn it when desired and a pin G should be set in the door to prevent the hooked end of the latch from falling too low when the door is open.

At H is shown the ordinary operating rope, by which the valve controlling the operating mechanism is moved. This is connected with a companion rope H′, in any convenient way, but at present I prefer to connect it as shown in Fig. 1, by making the two ropes of one continuous piece and passing it over a pulley J above and under another one (J′) below—the last one being mounted on a shaft $j$ that operates the valve.

Attached to the companion rope are several blocks or projections L, preferably set between guides $l$ on the walls of the well, so as to work freely within said guides. These blocks are so set that when the valve is closed and the car at rest, the upper and lower ones are slightly above and below lines drawn even with the top and bottom of the doors respectively, and the intermediate blocks are set just between lines drawn even with the top of one door and the bottom of the one next above it. With this arrangement, it is evident that when the operating rope is moved to give motion to the car, the companion rope will carry the tops of the blocks L either above a line drawn even with the bottoms of the car and well doors or the bottoms of the blocks below a line drawn even with the tops of said car and well doors; as the case may be, and thus prevent any opening of the same. It will also be seen that when any one of the well doors is is open, said door will be between two of the blocks, and thus the operating rope cannot be set in motion until the well door is closed.

As a further security, I set doors K in the elevator car, which project slightly from the car, as shown in Fig. 1; and I attach flanges M to the front walls of the well, so arranged that the door passes by the side of these flanges as the car ascends and descends, but cannot be opened when the car is in motion, as the edge of the door would come in contact with said flanges M. When, however, the car is at rest and on a level with either of the doors in the elevator well, the door can be readily opened. It will further be seen that the door in the elevator car, when opened, will also act as a stop to prevent the movement of the operating rope, as said door will then be between two of the blocks and thus prevent any motion being given to the rope, so that the car cannot be set in motion when the car door is open.

By the combination of the blocks L and flanges M, the maximum of safety is obtained, because the flanges M prevent the car door being opened when the car is between the well doors, and the blocks L prevent its being opened when opposite a well door if the car is in motion. If the blocks L did not prevent this, the door might be opened, or partially opened, when the car was in line with either of the well doors although the car was in motion.

In some cases, I may use the arrangement shown in Figs. 4, 5, 6 and 7. In this case, at each door of the well, a three-armed lever N is pivotally connected at its center to a bracket O attached to the wall of the well, and is also pivotally connected to a block L′ on the rope. These blocks may be attached to a companion rope, as in the form shown in Figs. 1, 2 and 3, but I have shown them attached, in this case, to the operating rope, which in this instance, is preferably arranged outside the car. The latter is provided with an aperture *b* in its side, through which the operator can pull the rope to stop or start the car. The lever N has two of its arms *n n* in line with each other, and a third (*n′*) at right angles to the other two.

When the car is at rest, the arms *n n* of the lever N stand vertically and then the car door can be opened. When opened, the car cannot be started, as the arms *n n* of the lever will press against the door if any attempt is made to pull the operating rope, so that the latter cannot be moved, nor the car started with the door open. As soon as the door is closed, the rope can be pulled, and then one of the arms *n* of the lever will pass behind the edge of the door, as shown in Fig. 7, in which position the door cannot be opened until the rope has been again manipulated so as to move the lever into the position shown in Fig. 6, in which case the car is stopped.

For convenience in stating my claims, I shall refer to the blocks and levers, generically, as "stops," and mean to include thereby not only the devices shown but any equivalent ones for the same purpose, except in such cases where the devices shown are specifically named.

I have shown different ways of carrying out my improvement, but it is evident that other means may be employed, and I do not, therefore, intend to limit myself to those shown in the drawings. For instance, instead of the rope shown, a wire or rod may be employed to carry the blocks L, and this rod or wire may form part of the operating rope, or be operated by any suitable connection therewith, and I should consider such rod or wire as an equivalent for the rope in the following claims.

What I claim as new is—

1. In an elevator and in combination with a slidable door and a controller therefor, a stop movable into the path of the door and simultaneously with the controller as said controller is moving to start the car, substantially as described.

2. In an elevator and in combination with the controller therefor, a stop connected to and moving with the controller, and a slidable door movable into the path of said stop, substantially as described.

3. The combination in an elevator having slidable well doors, and with the car operating devices and the controller therefor and said doors, of a series of stops arranged to move vertically into the path of the slidable doors when the car is to be started and to stand over a door when said door is open, substantially as described.

4. The combination in an elevator and with the car thereof, of doors in both the car and well openings, a rope connected with the operating devices, and stops moved by said rope for fastening the doors in both the car and well closed when the car starts, substantially as described.

5. The combination in an elevator and with the car thereof, of doors opening into the well, a rope connected with the operating devices, and a series of stops moved by the rope and adapted to pass behind the edge of the doors when the car is started, substantially as described.

6. The combination in an elevator and with the car thereof, of the door of the car and fixed stops secured to the well arranged to prevent the opening of the car door except when in line with the well doors, substantially as described.

7. The combination in an elevator and with the car, the door thereof and the operating rope, of a series of blocks L secured to said rope, arranged to pass behind the edge of the car door when the rope is moved to operate the car, substantially as described and shown.

8. The combination in an elevator and with the operating rope and car thereof, of a series of blocks L connected to said operating rope, and a door for said car projecting from the body of the car and passing between two of the blocks when opened, whereby the rope is fastened in position while the door is open, substantially as described.

In testimony whereof I affix my signature, in presence of two witnesses, this 18th day of September, 1893.

WELLINGTON P. KIDDER.

Witnesses:

FRED L. HARRINGTON,

HERBERT L. CHAPIN.